(No Model.)
W. L. SILVEY.
JOURNAL BEARING FOR DYNAMO ELECTRIC MACHINES.
No. 489,505. Patented Jan. 10, 1893.
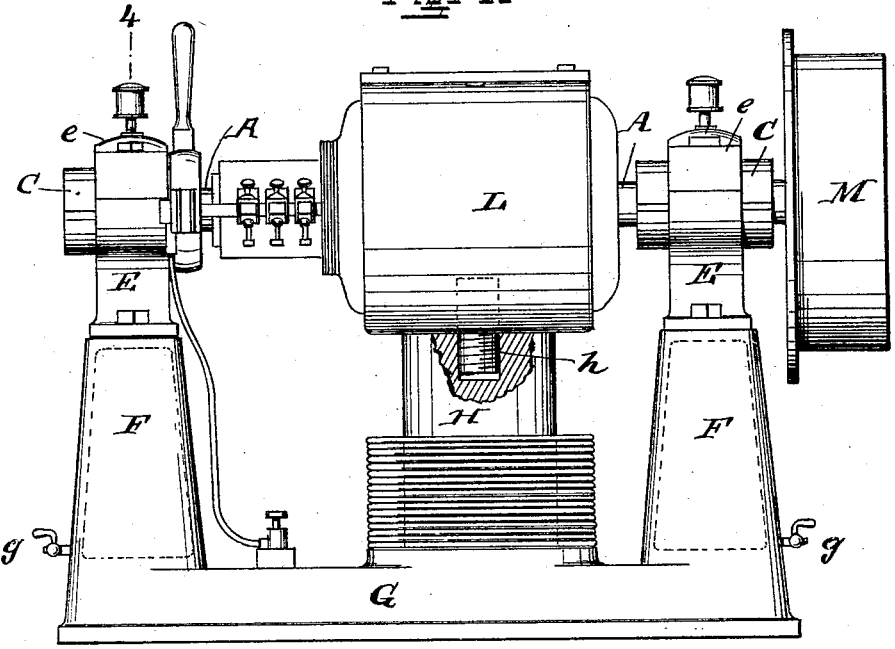
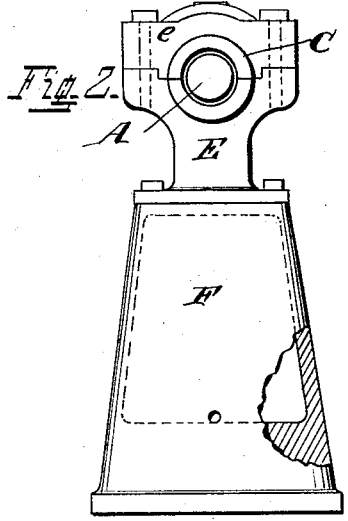
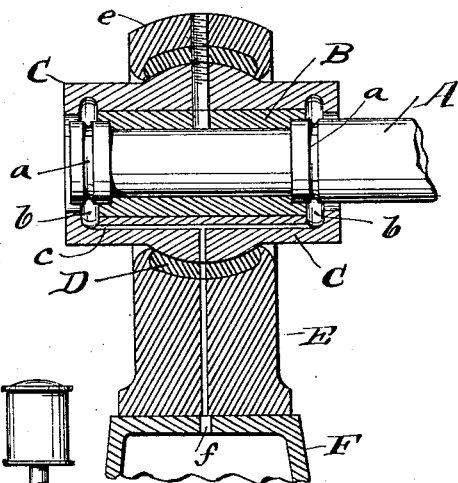
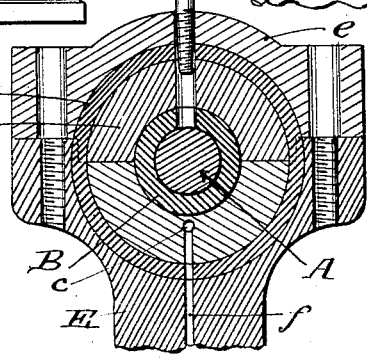
Attest:
F. P. Graf
J. N. Witmer
Inventor
William L. Silvey

UNITED STATES PATENT OFFICE.

WILLIAM L. SILVEY, OF LIMA, OHIO.

JOURNAL-BEARING FOR DYNAMO-ELECTRIC MACHINES.

SPECIFICATION forming part of Letters Patent No. 489,505, dated January 10, 1893.

Application filed May 13, 1889. Serial No. 310,578. (No model.)

*To all whom it may concern:*

Be it known that I, WILLIAM L. SILVEY, a resident of Lima, in the county of Allen and State of Ohio, have invented certain new and useful Improvements in Journal Bearings for Dynamo-Electric Machines, of which the following is a specification.

My invention relates entirely to the mechanical construction, and it is the object of this invention to construct a dynamo machine that is composed of as few parts as possible in the magnetic field, and at the same time one that will be easily constructed, and be solid when put together.

Another object is in the construction of the bearings to have what is known as a ball bearing, or globular bearing, one that is split to allow expansion to take place, without a liability of the shaft sticking, and at the same time an easy way of forming a perfect seat for the bearing or globe, and also a means for taking up and saving the waste oil, and to prevent too much lateral motion. All these points are fully illustrated by the accompanying drawings in which Figure 1. is a side elevation of the complete machine, with part of the field magnet coil removed, and part of the core broken away in order to show the manner of uniting the pole piece and core. Fig. 2. is an end view of the bearing. Fig. 3. is a longitudinal section through the bearing E, and sleeve at the commutator end of the machine. Fig. 4, is a cross section of this bearing along the dotted line 3, 4. of Fig. 1.

The base of the machine G, the two field magnet cores, H,—one at each side—one not shown—and the hollow pedestals F, are all cast in one piece. The hollow part in the pedestals is shown partly in section in Figs. 2 and 3, and also represented by dotted lines throughout. This hollow in the pedestal is for the reception of the waste oil which is drawn off at the two cocks *g, g*. On top of these pedestals are bolted standards E, and caps *e*, in which the globular bearings are located, and operate. These bearings are constructed as follows. When the standard E, and the cap *e* are cast, there is cast a globular cavity, one half being cast in the standard and the other half in the cap *e*. The joint between the cap and standard is now planed and they are bolted together in the usual manner. After this has been done the split sleeve is taken and the two parts are clamped together, and it is turned all over leaving a nearly perfect ball in the center as shown in Fig. 3. In other words when this sleeve has been turned it is a ball with two stems, one at each end and a hole extending through its length. These sleeves are now located at the proper place in the standard and cap, and a layer of molten Babbitt metal D is poured around them, which makes a perfect matrix, and the bearing or sleeve being globular allows it to move in this bed, and follow up any irregularity of the shaft A. The shaft is next placed in position in the split sleeve, and babbitted up in the usual manner, as is well known to all good machinists. This shaft is a straight piece of steel, except in one bearing where it is turned with a recess groove or in other words the shaft is made smaller as shown in Fig. 3. This recess filled with Babbitt metal prevents the principal amount of lateral motion. The oil from the cup flows along the shaft toward each end and is prevented from flowing out over the shaft by grooves *a, a*, where the oil flows off into the grooves *b, b*, in the sleeve C. The two grooves *b, b*, are joined together by a hole *c*, through which the wasts oil flows to the center, and thence down through the hole *f*, into the oil chamber in the pedestal F. The top of the pedestal F, and the top of the field magnet cores, H being planed off, there is drilled a hole in the field magnet cores, which is tapped out to receive a large screw stud *h*. This stud is preferably a piece of wrought iron cast into the pole piece L. However it may be a stem of cast iron, forming a part of the pole piece, but I prefer the former as it is not as liable to get broken off. This stud may be screwed into both the field magnet core and the pole piece.

When the bottom part of the pole piece has been properly planed, and the screw properly inserted, this makes a very substantial machine. The field magnet coils are wound on a form and slipped on the cores from the top, so that in case a coil becomes injured it is easily taken off and replaced by a perfect one.

Having fully described my invention what I, claim as new and wish to secure by Letters Patent in the United States is:—

1. In bearings for dynamo electric machines, the combination, with a pedestal block, of a standard thereon, a cap for the standard, a sleeve having a globular elevation pivotally placed between the standard and the cap, a soft metal lining for the standard supporting the sleeve, a soft metal lining in the sleeve supporting the shaft, there being circumferential oil grooves in each end of the sleeve, and an oil groove connecting the circumferential grooves together and to a central waste pipe, as set forth.

2. In a journal box for dynamo electric machines, the combination, with the shaft of a standard and cap having a recess in their interior, a split sleeve having a globular elevation around its center supported in a position in the recess in the standard and cap by a soft metal lining, the sleeve having an interior soft metal lining, the shaft being supported and journaled therein as specified.

3. In bearings for dynamo electric machines, the combination, with the base and pedestals, of standards E and caps $e$ supported thereby and having recesses, with a split sleeve contained therein, the space between the sleeve, the cap, and standard being filled with soft metal, and a soft metal lining in the sleeve for supporting a shaft, as specified.

WILLIAM L. SILVEY.

Witnesses:
F. S. POWER,
R. C. WARNER.